United States Patent [19]

Cope

[11] Patent Number: 4,786,018

[45] Date of Patent: Nov. 22, 1988

[54] SATELLITE ATTITUDE CONTROL

[75] Inventor: Paul E. G. Cope, Fareham, England

[73] Assignee: The Marconi Company Limited, England

[21] Appl. No.: 68,968

[22] Filed: Jul. 1, 1987

[30] Foreign Application Priority Data

Jul. 4, 1986 [GB] United Kingdom ............... 8616385

[51] Int. Cl.⁴ ............................................. B64G 1/26
[52] U.S. Cl. ................................. 244/164; 244/169; 244/171
[58] Field of Search ................ 244/164, 169, 171; 364/434, 454, 455, 459

[56] References Cited

U.S. PATENT DOCUMENTS

| | | | |
|---|---|---|---|
| 4,010,921 | 3/1977 | Pistiner et al. | 364/434 |
| 4,071,211 | 1/1978 | Muhlfelder et al. | 244/171 |
| 4,174,819 | 11/1979 | Bruderle et al. | 364/434 |
| 4,188,666 | 2/1980 | Legrand et al. | 364/434 |
| 4,294,420 | 10/1981 | Broquet | 244/171 |
| 4,370,716 | 1/1983 | Amieux | 244/169 |
| 4,437,047 | 3/1984 | Smay | 244/171 |

OTHER PUBLICATIONS

"Thrust Measuring System for Electrothermal Thrusters", B. C. Barber, *J. Spacecraft*, vol. II, No. 8, Aug. 1974.

Primary Examiner—Galen Barefoot
Assistant Examiner—L. M. Fiorito
Attorney, Agent, or Firm—Kirschstein, Kirschstein, Ottinger & Israel

[57] ABSTRACT

An attitude control system for satellites includes a sensor (10) for generating output signals in response to variations in the attitude of the satellite. These signals are applied to a Kalman filter (12) which models the dynamic state of the satellite and instructs an attitude controller (13) to generate control signals for controlling the actuators. The system is responsive to the actual physical performance of the actuators to provide feed back to the modelling circuit.

5 Claims, 1 Drawing Sheet

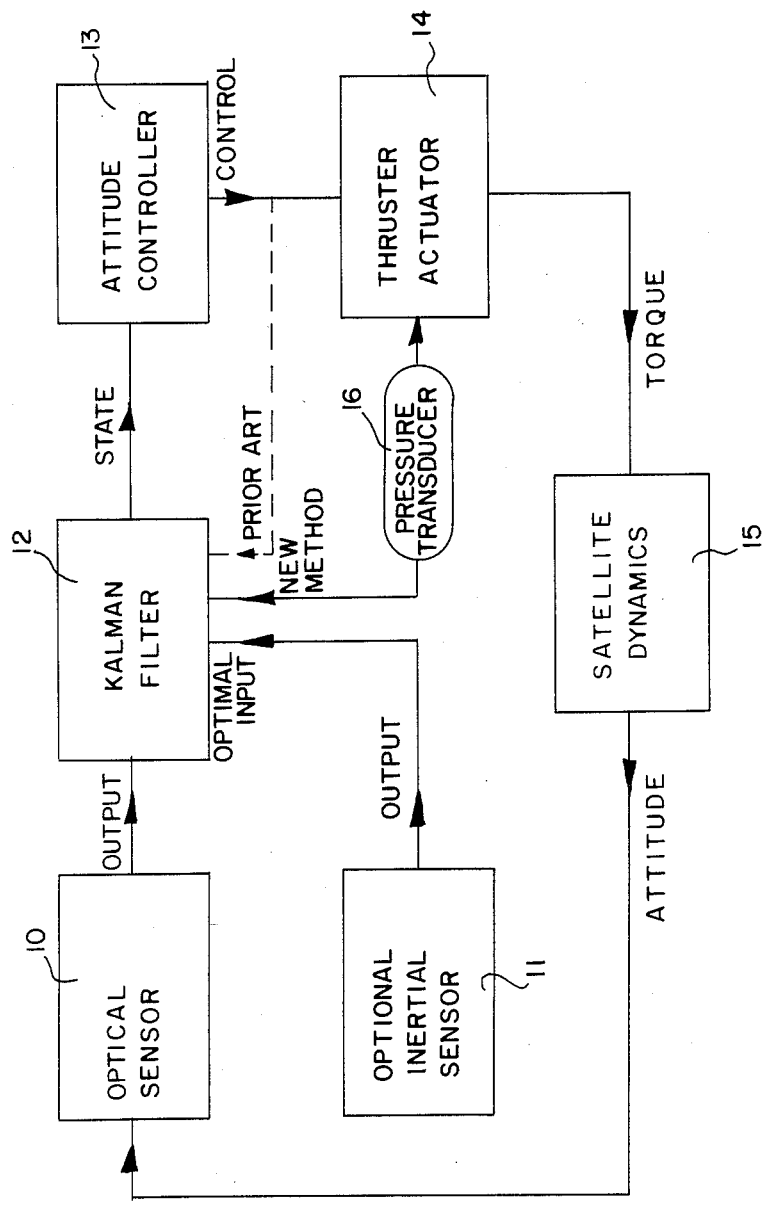

SATELLITE ATTITUDE CONTROL

BACKGROUND OF THE INVENTION

1. Field of the Invention

The present invention concerns the control of the attitude or pointing direction of artificial earth satellites.

2. Description of Related Art

Conventionally the attitude of a satellite is determined using attitude sensors which may take the form of optical or inertial sensors. Optical sensors utilise radiation emanating from a selected reference such as the sun, earth, moon or stars to output signals relating to the attitude of the satellite. Inertial sensors used in satellites are normally precision gyroscopes.

Inertial sensors have an advantage in respect of optical sensors in that they can often provide a superior signal to noise ratio over the majority of the frequency range of interest for satellite attitude sensing. This range is normally D.C. to 10 Hz. However they suffer from drift at the D.C. end of this range whereas optical sensors do not. On the other hand optical sensors suffer from the disadvantage that they can output unwanted noise as a contamination of the output signal either due to the weakness of the radiation being sensed or to the level of ambient electromagnetic disturbance in the complex and compact environment of the satellite.

A further disadvantage of inertial sensors is that at the high end of the frequency range of interest the output signals of even inertial sensors can be contaminated by an unacceptable level of noise. In the instance of gyroscopes this noise arises due to vibrations and variabilities introduced by the rotation of the gyroscope wheel and its ball races which can produce a variety of periodic disturbances in the 1 to 100 Hz region.

One attempt to overcome these disadvantages has been to use both inertial and optical sensors in a single attitude control system. In this known control system the outputs of the two types of sensor are combined in a Kalman filter. In order to improve performance it has also been proposed to feed into the Kalman filter the control signals used to control the actuators for altering the attitude of the satellite. Such actuators are conventionally thrusters or reaction wheels. Where such feedback of the actuator control signals has been used it has been found feasible to use a system which dispenses with the expensive inertial sensor. However even the use of the actuator control signals as feedback presents problems in that the degree of improvement available in the control of attitude by using this technique to dependent on the relationship between the control signals fed to the actuators which actually control satellite attitude and the actual response of the actuator in terms of its thrust or torque profile.

SUMMARY OF THE INVENTION

The present invention has for an object the reduction of the inaccuracies which can arise from the potential lack of a direct and consistent relationship between actuator control signals and the physical response of the actuators in an artifical satellite attitude control system.

Accordingly the present invention consists in an attitude control system for a satellite comprising actuators for altering the attitude of a satellite, a sensor for generating output signals in response to variations in the attitude of the satellite, a circuit modelling the dynamic state of the satellite to which the sensor signals are supplied, an attitude controller responsive to the modelling circuit for generating control signals for controlling the actuators, and means responsive to the actual physical performance of the actuators to provide feed back signals to the modelling circuit.

Preferably the modelling circuit is a Kalman filter. The actuators may be hot gas thrusters. In this instance the means for generating feedback signals may be pressure transducer associated with the reaction chambers of the thrusters.

BRIEF DESCRIPTION OF THE DRAWINGS

In order that the present invention may be more clearly understood an embodiment thereof will now be described by way of example and with reference to the accompanying drawing, in which the sole FIGURE is a block diagram of an attitude control system for an artificial satellite.

DETAILED DESCRIPTION OF THE PREFERRED EMBODIMENT

Referring now to the drawing there is shown, in block form only, an optical sensor 10 for detecting the attitude of an artificial earth satellite. This sensor is entirely conventional and will not be described in detail. Its function is to generate electrical signals which represent the attitude of the satellite with respect to a known optical source. An inertial sensor 11 is also shown in the drawing. Again the sensor is entirely conventional. Both sensors give output signals in accordance with the satellite's attitude to a Kalman filter 12. A Kalman filter is defined as a state estimator in which a complex electrical analogue or model of the dynamics of the satellite performs the estimation of state on the basis of the various input signals. The satellite may or may not possess significant angular momentum in order to account for the situuation where the satellite has significant angular momentum, e.g. a satellite in permanent rotation, the dynamic model represented by the Kalman filter merely needs to be chosen appropriately. Thus the signals from the two sensors 10 and 11 are combined in the Kalman filter 12. As any variation in the signals from the sensors 10 and 11 represents a dynamic change in the satellite system modelled by the Kalman filter, this produces appropriate output signals which are supplied by Kalman filter 12 to an attitude controller 13. The attitude controller 13 generates the actual control signals which are supplied to the actuators which control the attitude of the satellite. In the present embodiment the actuators are thrusters 14. The thrusters may be hot gas thrusters making use of catalytic decomposition of monopropellants such as hydrazine, though many other types of bipropellant or cold gas thrusters can also be used. In a conventional attitude control system employing an attitude sensor and a Kalman filter the control signals from the attitude controller are fed back to the Kalman filter to provide a feed back loop so that the Kalman filter continues to model the dynamics of the satellite. The effect of the thrusters is to alter the satellite dynamics as is indicated in box 15 of the accompanying drawing which in turn alters the inputs to attitude sensors 10 and 11.

However as mentioned the relationship between the control signals from the attitude controller 13 and the actual physical effect produced by the thrusters is sufficiently inaccurate to generate discrepancies.

It is normal to fit hot gas thrusters with a reaction chamber tap-off pipe to which a pressure measurement transducer can be fitted for test purposes. However in the system according to the present invention which is now being described such reaction chamber pressure transducers 16 are fitted not only for test purposes but for operational use. Furthermore it is the outputs of the permanently fitted reaction chamber pressure transducers 16 which are fed to the Kalman filter 12 rather than the control signals from the attitude controller 13. The relationship between the pressure transducer signals and the actual thrust generated by the thrusters is closer than the relationship between the control signals from attitude controller 13 and the actual thrust. This enables a much more precise estimate of the attitude state of the satellite to be made by the Kalman filter. This is a particular advantage when the satellite attitude control system does not employ an inertial sensor and also when accurate measurements of the rate of rotation of the satellite form part of the estimated attitude state.

Whilst the foregoing description has been directed to utilising reaction chamber pressure of hot gas thrusters to provide inputs to a Kalman filter, it will be appreciated that the concept behind this is applicable to other forms of actuators used to vary the attitudes of satellites. The basic principle is that the feedback to the Kalman filter after a change of satellite attitude has been initiated should not be the control signals which caused the operation of the actuators, but a direct measurement of the effect of the actuators.

It will be understood that the term satellite as used in this specification is intended to cover space vehicles other than those which are merely in orbit.

It will also be appreciated that the Kalman filter need not necessarily be located within the actual spacecraft. Thus it can be earth-based with the measurements from the pressure transducers 16 transmitted to the earth station via the normal satellite communication channels. One way in which the information could be transmitted is by taking an integral of the measured values over a given pulse of operation.

I claim:

1. An attitude control system for a satellite, comprising:
   (a) thrusters for altering the attitude of the satellite;
   (b) a sensor for generating output signals in response to variations in the attitude of the satellite;
   (c) a Kalman filter for modeling the dynamic state of the satellite to which the sensor output signals are applied;
   (d) an attitude controller responsive to said Kalman filter for generating control signals for controlling said thrusters; and
   (e) pressure transducers associated with said thrusters so as to be responsive to the actual physical response of the thrusters alone for providing feedback to said Kalman filter.

2. An attitude control system for a satellite, comprising:
   (a) a Kalman filter for modeling the dynamic state of the satellite;
   (b) a sensor for generating output signals in response to variations in the attitude of the satellite and supplying said output signals to said Kalman filter;
   (c) hot gas thrusters having reaction chambers and operative for altering the attitude of the satellite in response to control signals;
   (d) an attitude controller responsive to said Kalman filter for generating control signals for controlling said hot gas thrusters; and
   (e) pressure transducers associated with the reaction chambers of said thrusters for providing for said Kalman filter feedback signals related to the actual thrust generated by said thrusters.

3. A system as claimed 2, wherein the satellite dynamic model includes the effect of significant angular momentum.

4. A system as claimed in claim 3, wherein the Kalman filter is based terrestrially, means being provided for telemetering outputs of the pressure transducers to the earth-based Kalman filter.

5. A system as claimed in claim 4 wherein the reaction chambers have a pressure which is telemetered in the form of an integral over a given pulse of operation.

* * * * *